/

US011358345B2

(12) United States Patent
Georgeson et al.

(10) Patent No.: US 11,358,345 B2
(45) Date of Patent: Jun. 14, 2022

(54) INTERNAL TOOLING FOR COMPOSITE PARTS

(71) Applicant: The Boeing Company, Chicago, IL (US)

(72) Inventors: Gary E. Georgeson, Tacoma, WA (US); Kenneth Harlan Griess, Kent, WA (US)

(73) Assignee: The Boeing Company, Chicago, IL (US)

( * ) Notice: Subject to any disclaimer, the term of this patent is extended or adjusted under 35 U.S.C. 154(b) by 372 days.

(21) Appl. No.: 16/237,934

(22) Filed: Jan. 2, 2019

(65) Prior Publication Data

US 2020/0207031 A1 Jul. 2, 2020

(51) Int. Cl.
*B29C 70/30* (2006.01)
*B33Y 80/00* (2015.01)
*B29C 33/38* (2006.01)
*B32B 1/08* (2006.01)
*B29C 64/10* (2017.01)
*B33Y 10/00* (2015.01)
*B29K 105/08* (2006.01)
(Continued)

(52) U.S. Cl.
CPC .......... *B29C 70/30* (2013.01); *B29C 33/3842* (2013.01); *B29C 64/10* (2017.08); *B32B 1/08* (2013.01); *B33Y 10/00* (2014.12); *B33Y 80/00* (2014.12); *B29K 2105/0872* (2013.01); *B29K 2307/04* (2013.01); *B29K 2705/02* (2013.01); *B29K 2705/08* (2013.01); *B29K 2905/02* (2013.01); *B29K 2905/08* (2013.01); *B29L 2031/3076* (2013.01)

(58) Field of Classification Search
CPC ....... B32B 1/08; B29C 33/3842; B29C 64/00; B29C 64/10; B29C 64/165; B29C 70/30; B29C 70/446; B29C 70/54; B29C 70/68; B29C 70/72; B33Y 10/00; B33Y 70/00; B33Y 70/10; B33Y 80/00; B29K 2105/0872
See application file for complete search history.

(56) References Cited

U.S. PATENT DOCUMENTS 8,652,606 B2  2/2014  Griess et al.
8,894,801 B2  11/2014 Griess et al.
(Continued)

FOREIGN PATENT DOCUMENTS

GB           2105254 A      3/1983

OTHER PUBLICATIONS

European Search Report; Application EP19210854; dated May 28, 2020.
(Continued)

*Primary Examiner* — Walter Aughenbaugh
(74) *Attorney, Agent, or Firm* — Duft & Bornsen, PC

(57) ABSTRACT

Systems and methods are provided for composite part fabrication. One embodiment is a method for fabricating a composite part. The method includes selecting a tool with sides made of a core material in a desired size and shape, disposing a preform of a fiber reinforced material that surrounds the tool, resulting in a lamina assembly comprising the preform and the tool, heating the tool and the preform, co-bonding the tool to the fiber reinforced material within the lamina assembly, and hardening the preform and the tool into a hybrid composite part.

20 Claims, 14 Drawing Sheets

(51) Int. Cl.
    *B29K 307/04*   (2006.01)
    *B29K 705/02*   (2006.01)
    *B29K 705/08*   (2006.01)
    *B29L 31/30*    (2006.01)

(56) References Cited

U.S. PATENT DOCUMENTS

| | | |
|---|---|---|
| 8,993,084 B2 | 3/2015 | Griess et al. |
| 9,441,652 B2 | 9/2016 | Griess et al. |
| 9,522,512 B2 | 12/2016 | Georgeson et al. |
| 9,630,376 B2 | 4/2017 | Griess et al. |
| 9,868,233 B2 | 1/2018 | Mishra et al. |
| 9,919,507 B2 | 3/2018 | Georgeson et al. |
| 10,112,373 B2 | 10/2018 | Griess et al. |
| 2006/0108057 A1 | 5/2006 | Pham et al. |
| 2014/0186588 A1 | 7/2014 | Victorazzo |
| 2015/0099096 A1* | 4/2015 | Forston .............. B32B 27/20 |
| | | 428/162 |
| 2017/0095983 A1 | 4/2017 | Offensend et al. |
| 2017/0100909 A1 | 4/2017 | Georgeson et al. |

OTHER PUBLICATIONS

European Office Action; Application 19210854.6; dated Apr. 19, 2021.

* cited by examiner

INTERNAL TOOLING FOR COMPOSITE PARTS

FIELD

The disclosure relates to the field of fabrication, and in particular, to composite parts.

BACKGROUND

Composite parts, such as Carbon Fiber Reinforced Polymer (CFRP) parts, are utilized to provide structural strength for vehicles as well as for structures. During fabrication, a composite stringer or other structural support may be created by laying up sheets of fiber in a desired shape. This may result in a "C" shaped cross-section, an "I" shaped cross-section, a hat shaped cross-section, or others. When sheets of fiber are laid up together and contoured to form a desired shape, gaps may form in the bend radius and/or at joints between the sheets. It is undesirable to have gaps in the finished structure, thus a challenge remains in filling these gaps.

Therefore, it would be desirable to have a method and apparatus that take into account at least some of the issues discussed above, as well as other possible issues.

SUMMARY

Embodiments described herein provide tooling that defines a shape for a preform during layup, and is made integral with the preform during hardening of the preform into a hybrid composite part. Thus, while the tooling is originally used to define a shape for laying up unhardened fiber reinforced material, the tooling is co-bonded with the fiber reinforced portions during the hardening process. This results in a hybrid composite part made of both the tooling and fiber reinforced material. The tooling forms the core of the hybrid composite part and structurally reinforces composite material within the hybrid composite part. The tooling therefore acts as a forming tool for the hybrid composite part and also as a component that enhances structural strength. This provides an advantage in the form of enhanced ease of manufacture as well as increased strength for composite parts.

One embodiment is a method for fabricating a composite part. The method includes selecting a tool with sides made of a core material in a desired size and shape, disposing a preform of a fiber reinforced material that surrounds the tool, resulting in a lamina assembly comprising the preform and the tool, heating the tool and the preform, co-bonding the tool to the fiber reinforced material within the lamina assembly, and hardening the preform and the tool into a hybrid composite part.

A further embodiment is a non-transitory computer readable medium embodying programmed instructions which, when executed by a processor, are operable for performing a method for fabricating a composite part. The method includes selecting a tool with sides made of a core material in a desired size and shape, disposing a preform of a fiber reinforced material that surrounds the tool, resulting in a lamina assembly comprising the preform and the tool, heating the tool and the preform, co-bonding the tool to the fiber reinforced material within the lamina assembly, and hardening the preform and the tool into a hybrid composite part.

An additional embodiment is a manufacture in the form of a hybrid composite part. The manufacture includes a tool, and fiber reinforced material that surrounds the tool and is co-bonded with the tool. The tool surrounds a void.

A still-further embodiment is an apparatus in the form of a hybrid composite part. The apparatus includes tooling comprising a body with sides made of a core material in a desired size and shape, and is made of a material that remains rigid at a curing temperature for a fiber reinforced material. The tooling also includes one or more flanges disposed where the sides are joined together. The hybrid composite part also includes a void within the body that proceeds along an axial length of the body.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Composite parts, such as Carbon Fiber Reinforced Polymer (CFRP) parts, are initially laid-up in multiple layers that together are referred to as a preform. Individual fibers within each layer of the preform are aligned parallel with each other, but different layers may exhibit different fiber orientations in order to increase the strength of the resulting composite along different dimensions. The preform may include a viscous resin that solidifies in order to harden the preform into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber may be infused with resin prior to curing. For thermoset resins, the hardening is a one-way process referred to as curing, while for thermoplastic resins, the resin may reach a viscous form if it is re-heated.

Figure 1:
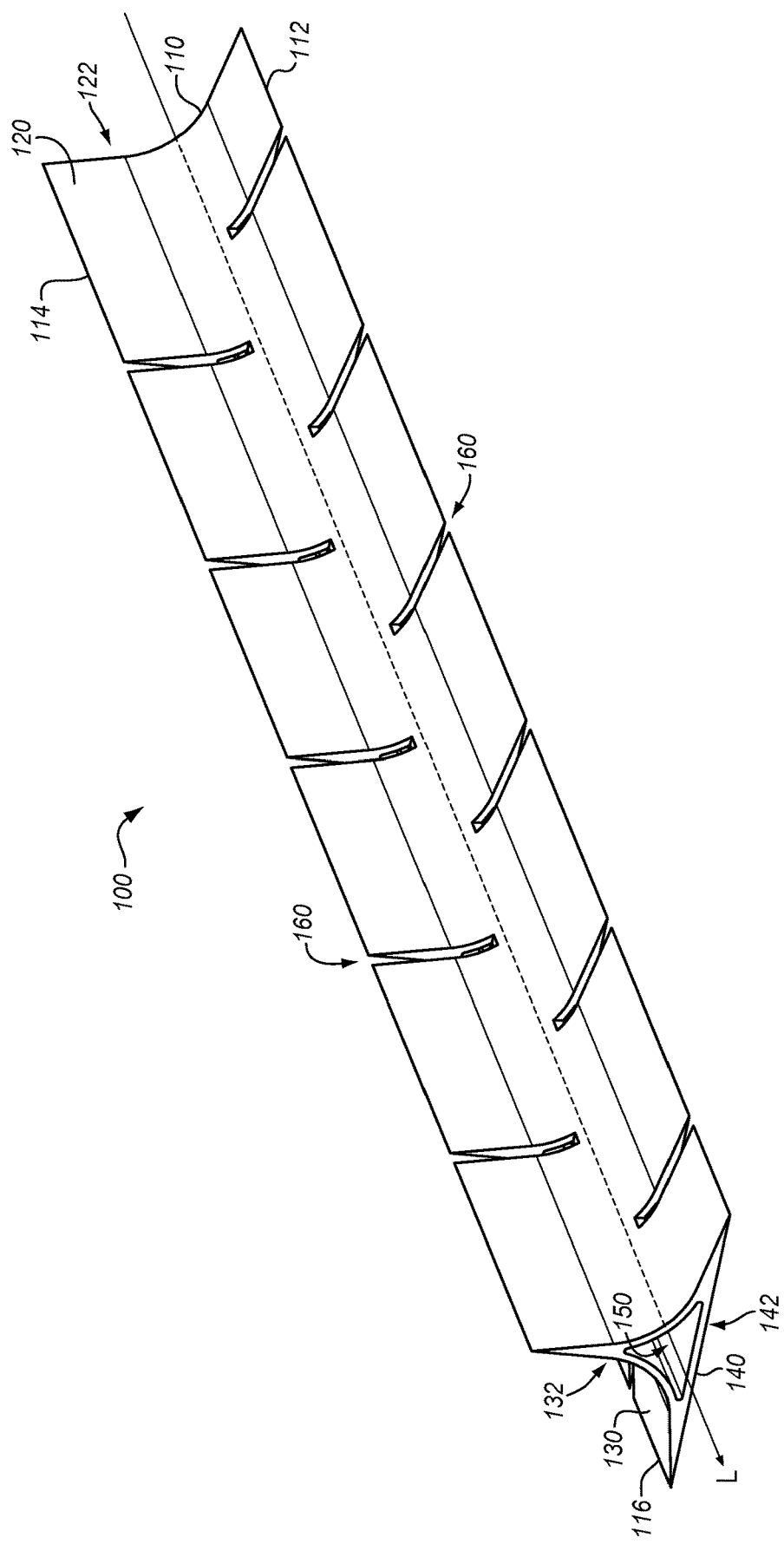
FIG. 1 illustrates tooling for a hybrid composite part in an illustrative embodiment.

FIG. 1 illustrates tooling 100 for a hybrid composite part in an illustrative embodiment. As used herein, a "hybrid composite part" is a part that includes a composite material (e.g., a fiber reinforced composite material, such as CFRP) that surrounds a core made from a different material.

Tooling 100 comprises any suitable rigid material that defines a shape for a preform of fiber reinforced material and is capable of withstanding heat and temperature applied during hardening of the fiber reinforced material (e.g., a curing temperature of roughly 500° Fahrenheit (F) for thermoset parts and roughly 900° F. for thermoplastic parts). Tooling 100 may also be referred to herein as a "tool." Tooling 100 becomes integral with the fiber reinforced material during hardening. For example, tooling 100 may be made from sheets of a core material such as a metal (e.g., titanium, aluminum), an additive manufacturing material applied via an additive manufacturing process, etc. In further embodiments, the core material may be lighter by volume than solid CFRP. This lightness provides a technical benefit by reducing weight, which results in less fuel costs if the resulting composite part is used in a vehicle.

In still further embodiments, it may be desirable for the elastic modulus and/or coefficient of thermal expansion of the core material to substantially match that of the rest of the composite part (e.g., in order to prevent internal stresses within the completed, cured part that would result from mismatched elastic moduli). In such embodiments, tooling 100 may have an elastic modulus between one half and one and a half times an elastic modulus of the fiber reinforced material. In this manner, when the tooling 100 forms part of a hybrid composite part, elastic deflection of the hybrid composite part will not damage or break the bond between tooling 100 and any fiber reinforced portions of the hybrid composite part.

Tooling 100 includes a body 110 with sides (i.e., side 120, side 130, and side 140). While body 110 is elongated in this embodiment, body 110 may be formed according to any suitable shape in further embodiments. Each side of tooling 100 is shaped according to a contour. In this embodiment, side 120 is shaped according to contour 122 (which is arcuate), side 130 is shaped according to contour 132 (which is arcuate), and side 140 is shaped according to contour 142 (which is flat). These contours define the shape which will be taken by a preform disposed (e.g., placed or laid-up) atop tooling 100. Conceptualized another way, the sides of tooling 100 are complementary to the sides of a cavity that will exist within a laminate that will be disposed at tooling 100. Side 130 and side 120 are radiused due to bends that will exist in the laminate, while side 140 is flat.

In this embodiment, cut-outs 160 are distributed along a length of body 110, resulting in flanges 112, flanges 114, and flanges 116 disposed where the sides join together. Cut-outs 160 increase an amount of flexibility of tooling 100, allowing tooling 100 to bend more readily along its lengthwise axis L. The cut-outs specifically increase flexibility by reducing an amount of material at specific locations. This reduces resistance to flexing at those locations, because the locations have reduced flexural stiffness/reduced rigidity. Cut-outs may, for example, extend from half to an entire height of a flange, may be several millimeters across, and may be disposed at intervals ranging from every few centimeters or every few meters, depending on the amount of flexion desired. For straight tooling 100 that will not experience dynamic bending loads, no cut-outs are needed. While referred to as "cut-outs," cut-outs 160 need not be physically cut out of body 110, but rather may comprise gaps where material is not placed during fabrication of body 110.

This may be beneficial in environments where tooling 100 will experience flexion after it has been integrated into a hybrid composite part. This flexion may also allow for tooling 100 to bend to accommodate joggles, bends or twists in a cavity at the laminate. Tooling 100 also includes void 150 in this embodiment. Void 150 is a space through which cabling or electromagnetic signals may be conveyed. For example, void 150 may facilitate non-destructive inspection of tooling 100 via ultrasonic waves.

Illustrative details of the operation of tooling 100 will be discussed with regard to FIG. 2. Assume, for this embodiment, that tooling 100 has been fabricated via a mold or via additive manufacturing processes.

Figure 2:
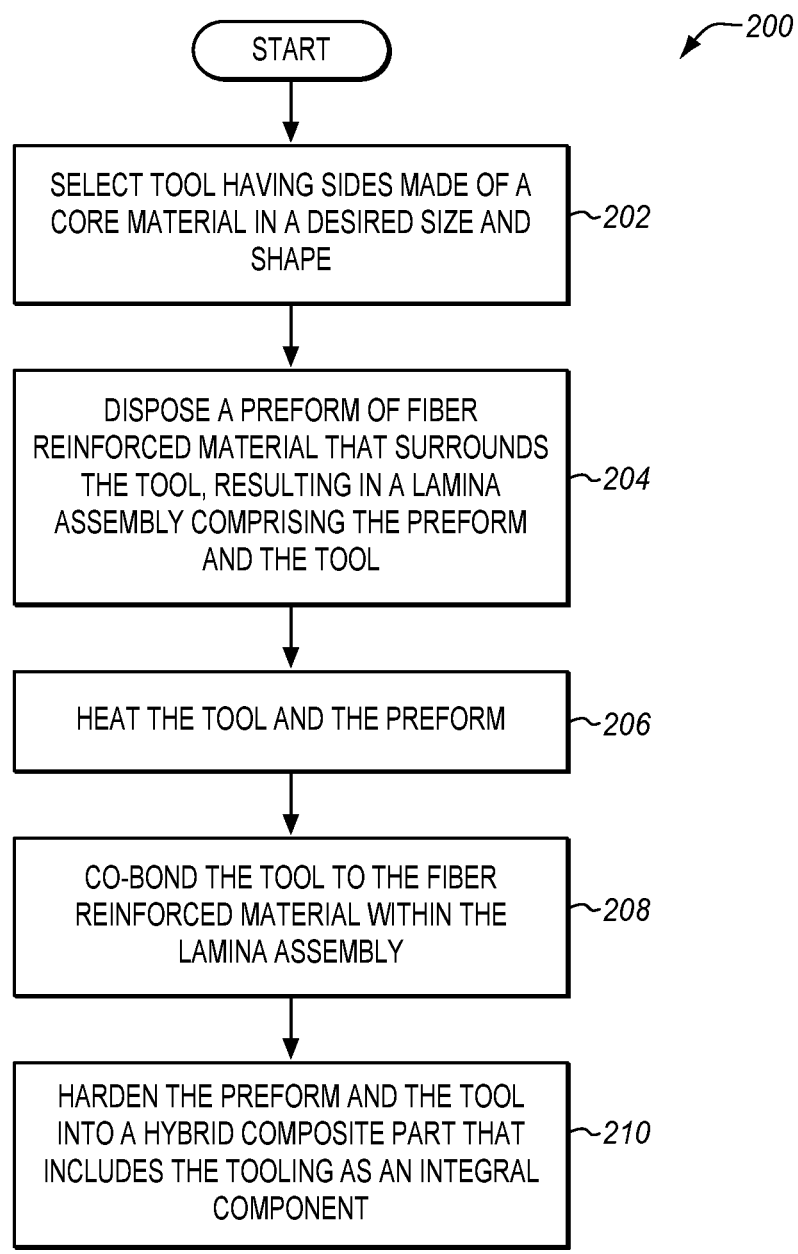
FIG. 2 is a flowchart illustrating a method for utilizing tooling during fabrication of a hybrid composite part in an illustrative embodiment.

FIG. 2 is a flowchart illustrating a method 200 for utilizing tooling during fabrication of a hybrid composite part in an illustrative embodiment. The steps of method 200 are described with reference to tooling 100 of FIG. 1, but those skilled in the art will appreciate that method 200 may be performed for other tooling that will be integrated into a hybrid composite part. The steps of the flowcharts described herein are not all inclusive and may include other steps not shown. The steps described herein may also be performed in an alternative order.

In step 202, tooling 100 is selected, having a body and sides made of a core material with a desired shape and size. Tooling 100 may be selected, for example, based on its shape and a desired shape of a hybrid composite part to be fabricated, in accordance with a predetermined schedule, etc.

In step 204, a preform of fiber reinforced material (e.g., preform 350 of FIG. 3) is disposed so that it surrounds the body 110 (e.g., surrounding the sides of tooling 100). This results in a lamina assembly 300 comprising the preform 350 and the tooling 100. For example, as shown in lamina assembly 300 of FIG. 3, preform 350 comprises sheet 360, sheet 370, and sheet 380 of CFRP which surround the perimeter of tooling 100. That is, preform 350 is disposed (e.g., laid-up, placed after being laid-up flat elsewhere, etc.) atop side 120, side 130, and side 140 of tooling 100, respectively. Because tooling 100 is rigid, it defines the contours of the sheets of preform 350. Tooling 100 also fills internal corners 352 of preform 350, and receives stresses via internal corners 352. This enhances the structural strength of a resulting hybrid composite part, by increasing the ability of that part to resist delamination when experiencing stress. For example, because tooling 100 tapers within preform 350, it exhibits an increased amount of interfacial contact between tooling 100 and preform 350. Thus, the taper (e.g., at a rate between five to one and one hundred to one), provides a technical effect in the form or increasing bond strength based on the increased amount of interfacial contact between tooling 100 and preform 350. The increased amount of interfacial contact increases an area along which tooling 100 and preform 350 are bonded, which in turn increases bond strength between these components. While a portion of tooling 100 is illustrated as projecting outward from preform 350 in FIG. 3, it will be appreciated that such portions are for illustrative and contextual purposes only, no portions of tooling 100 need project outward from preform 350.

In one embodiment, the tooling described herein is also shaped to provide support against crushing loads, because it increases an amount of material within the hybrid composite part that resists crushing forces. The tooling described herein may even provide limited structural support with regard to tensile bending loads at the hybrid composite part.

With preform 350 in place at tooling 100, such as via placement of tooling 100 atop sheet 380, and bending of sheet 360 and sheet 370 onto tooling 100, preform 350 and tooling 100 may be placed into a vacuum bag for compaction and curing, or may be placed into a mandrel for compaction and curing. In step 206, tooling 100 and preform 350 are heated. This may initiate a curing or other hardening process for resin within preform 350.

In step 208, the tooling 100 is co-bonded to the fiber reinforced material within the lamina assembly 300. This may come about as a result of the hardening process of step 206.

In step 210, preform 350 and tooling 100 are hardened into a hybrid composite part that includes tooling 100 as an integral component. In a thermoset environment, the heating in step 206 cures resin within preform 350. This action of heating therefore co-bonds the preform 350 to tooling 100. That is, resin within tooling 100 hardens and bonds to the core material that tooling 100 is made from. In a thermoplastic environment, cooling of preform 350 (after preform 350 has reached a molten state) causes preform 350 to solidify and harden around tooling 100. Because tooling 100 is rigid, preform 350 will not collapse during the consolidating and/or hardening process. If tooling 100 was absent or not rigid, then the potential for collapse of preform 350, and any cavities defined by preform 350, would be substantial.

Method 200 provides a technical benefit by providing tooling 100 which both defines a shape for, and enhances the strength of, a composite part. For example, tooling 100 may enhance the strength of internal corners at a resulting hybrid composite part. This means stresses received while bearing load at the hybrid composite part are transferred from an exterior of the hybrid composite part (i.e., a fiber reinforced portion) to the tooling, which forms a core of the hybrid composite part. Depending on the dimensions and material properties of the hybrid composite part, this facilitates elastic deformation of the hybrid composite part in a predefined and desired manner in response to an applied stress. Furthermore, because tooling 100 is integrated into the preform, tooling 100 does not have to be removed from the preform (which may be a difficult process) after hardening of the preform. This saves labor related to removing the tooling, and prevents the composite part from being damaged by any removal process.

Figure 3:
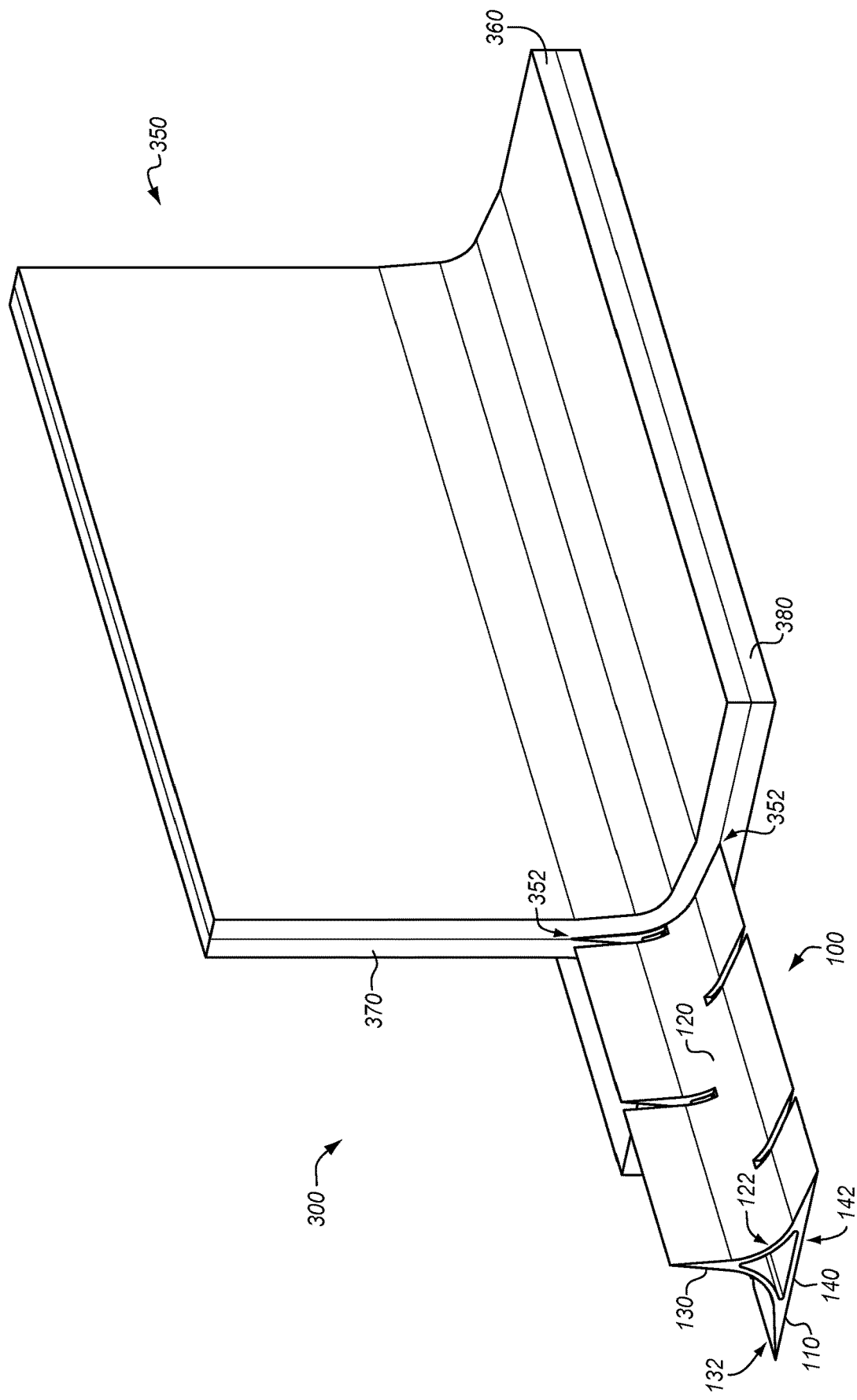
FIG. 3 is a perspective view illustrating layup of a preform that conforms with contours defined by internal tooling in an illustrative embodiment.

FIG. 3, which has been described above with respect to the method of FIG. 2, illustrates a lamina assembly 300 in the form of a blade stiffener or inverted "T." However, FIG. 3 illustrates but one of many potential versions of blade stiffeners that may be utilized according to the embodiments described herein.

Figure 4:
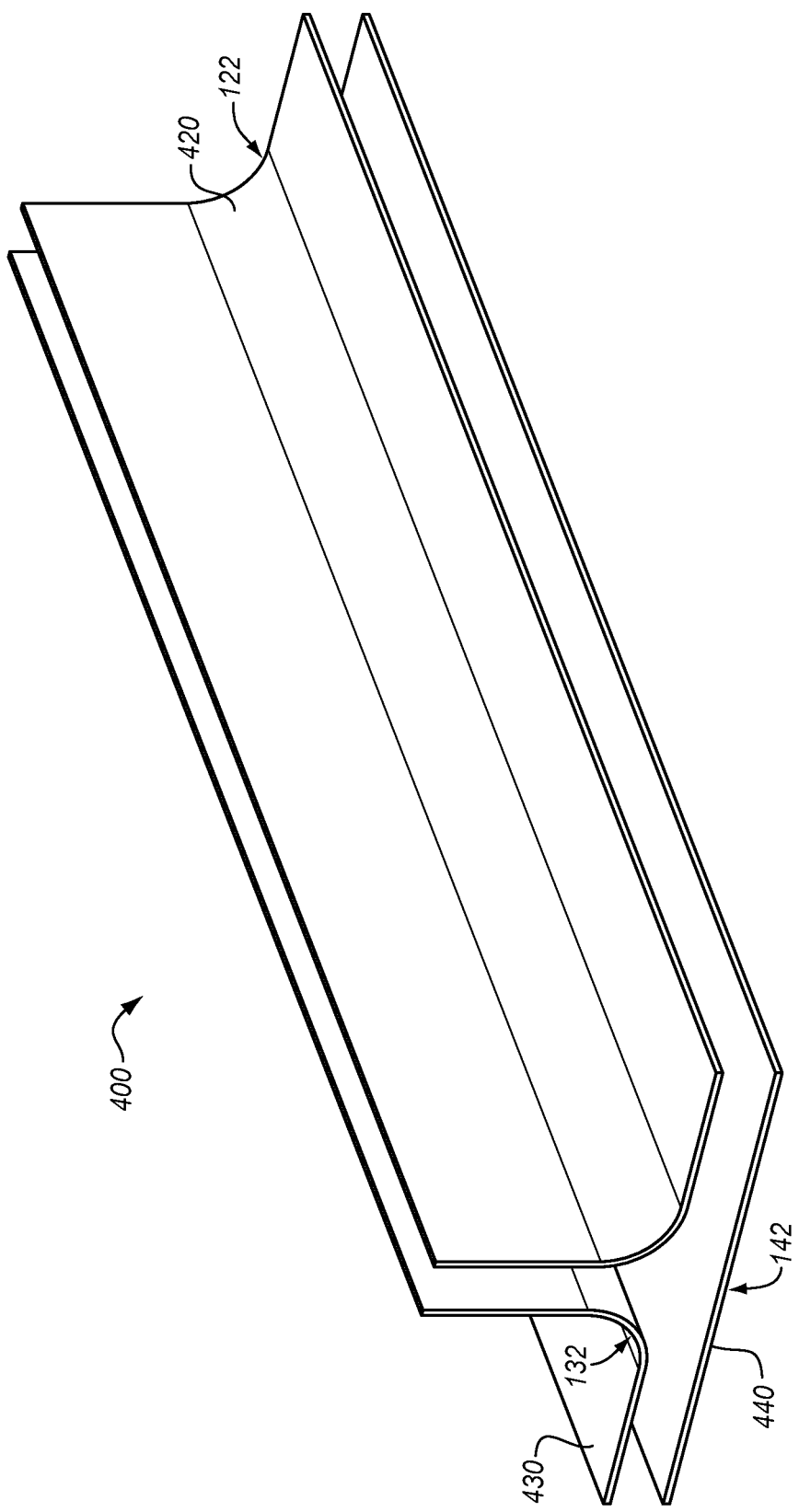
FIG. 4 is an exploded view of tooling made from multiple sheets of core material in an illustrative embodiment.

FIG. 4 is an exploded view of tooling 400 made from multiple sheets of core material in an illustrative embodiment. Tooling 400 may be utilized as a mandrel upon which preform 350 is disposed and hardened. Thus, tooling 400 may be utilized in a similar manner to tooling 100. The sheets of core material are welded or bonded together to form the tooling 400, and cut-outs may then be added to the tooling 400 at a later stage. In this embodiment, sheet 420 is shaped according to contour 122, sheet 430 is shaped according to contour 132, and sheet 440 is shaped according to contour 142. These contours are complementary to radii of bends found in sheet 360 and sheet 370 of preform 350. The fabrication techniques for creating tooling 100 discussed in FIG. 4 may be used as an alternative to additive manufacturing techniques, if desired.

Figure 5:
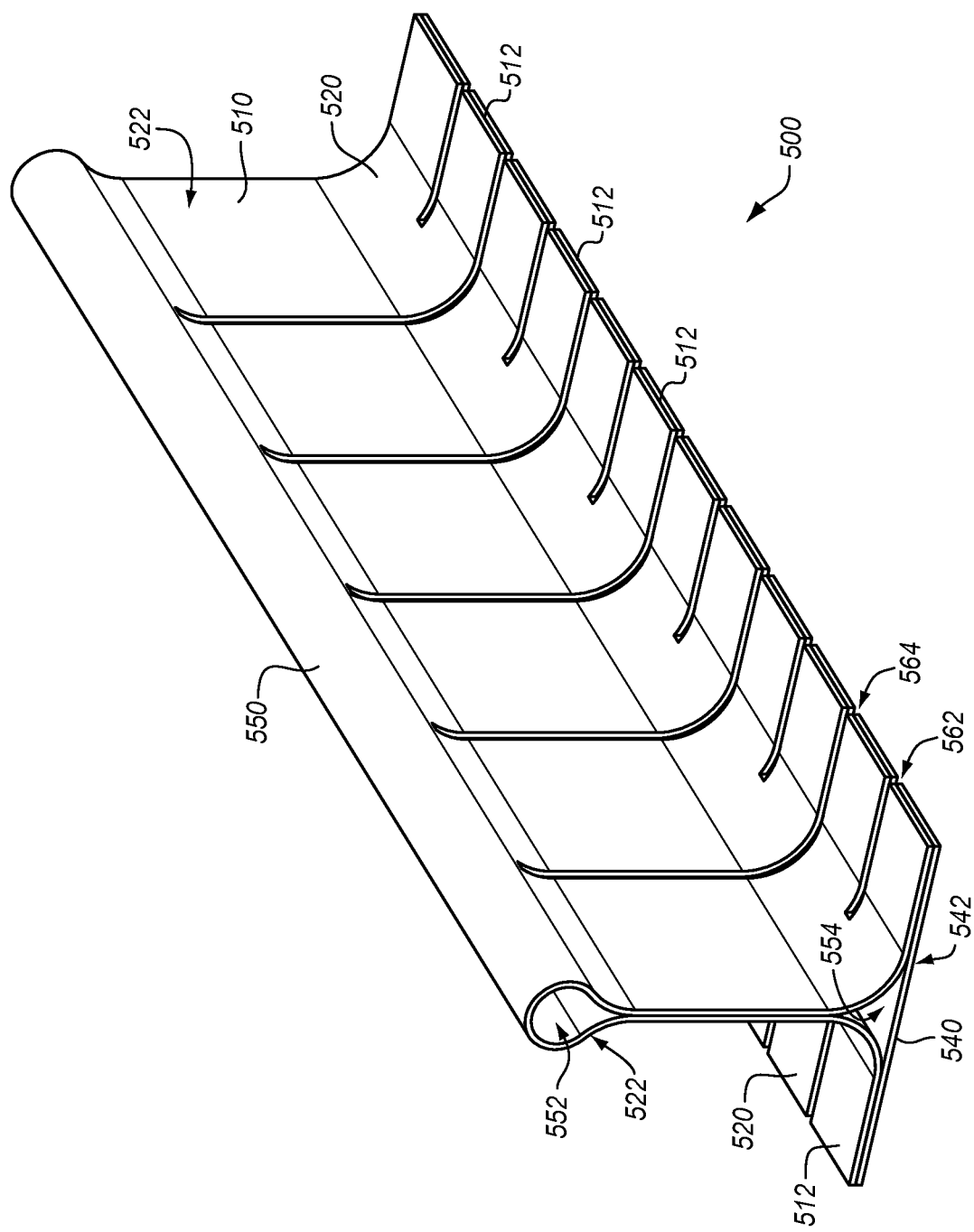
FIGS. 5-12 illustrate additional tooling and preforms in illustrative embodiments.

FIGS. 5-12 illustrate additional tooling in combination with preforms in illustrative embodiments. FIG. 5 illustrates tooling 500 in an illustrative embodiment. In FIG. 5, tooling 500 includes a side 520, which forms a top following a contour 522. Tooling 500 also includes a side 540, which forms a bottom following a contour 542. Contour 522 defines rounded section 550, which surrounds a void 552. Cut-outs 562 and cut-outs 564 subdivide a periphery 510 of tooling 500 into flanges 512. Tooling 500 may provide enhanced structural strength for composite parts having complex geometries. Alternatively, tooling 500 may be utilized in order to define a path for cabling or electromagnetic signaling to pass through in a resulting hybrid composite part. In one embodiment, void 552 is used for this purpose. Tooling 500 may be utilized for supporting a laminate that will be hardened into a blade stiffener. One sheet of the laminate may be bent around side 520, while another sheet of the laminate may be placed below side 540. Tooling 500 may support these sheets during hardening, enforcing a desired shape onto the laminate and enabling one or more voids such as void 552 and void 554 to be formed as desired.

Figure 6:
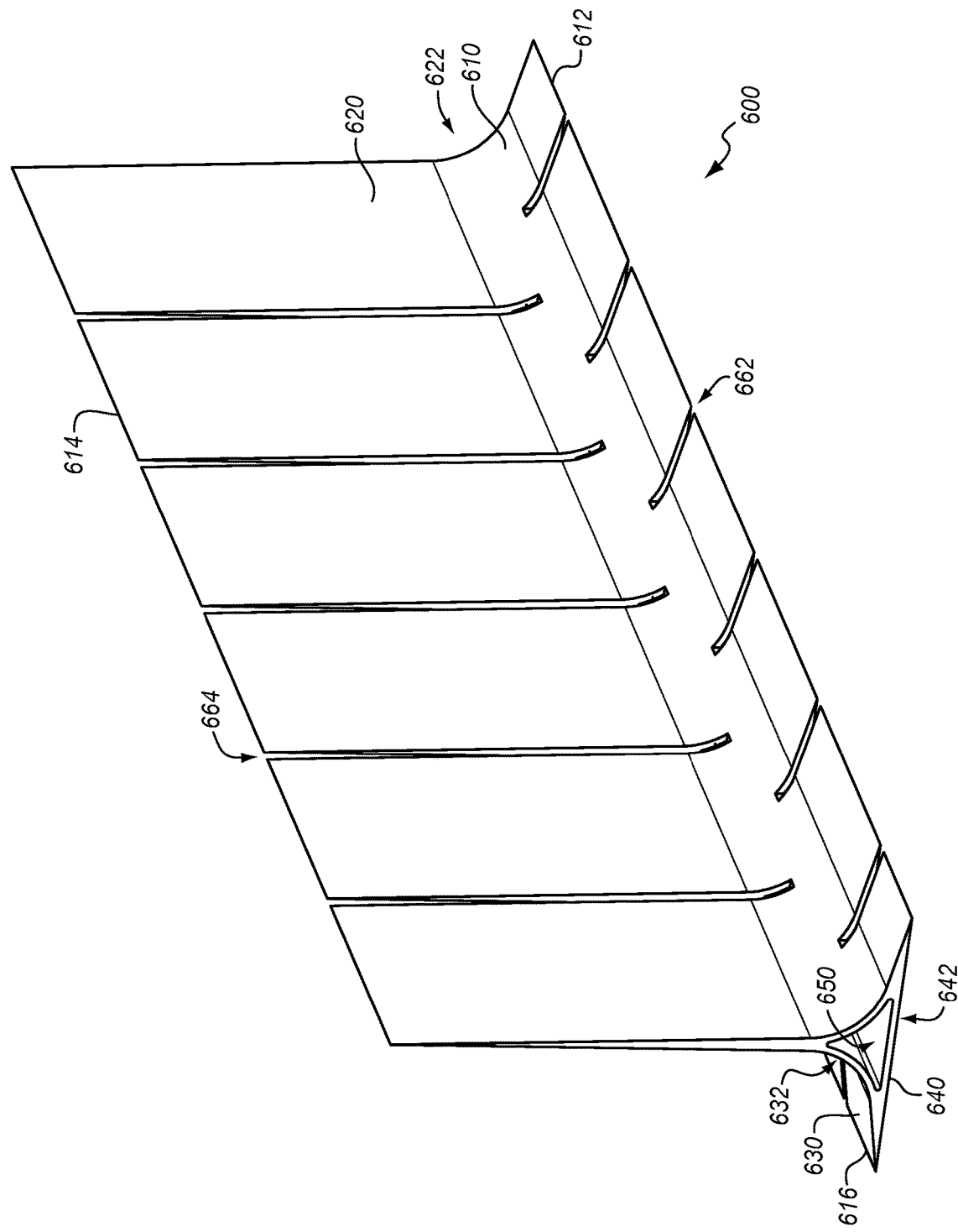
Figure 7:
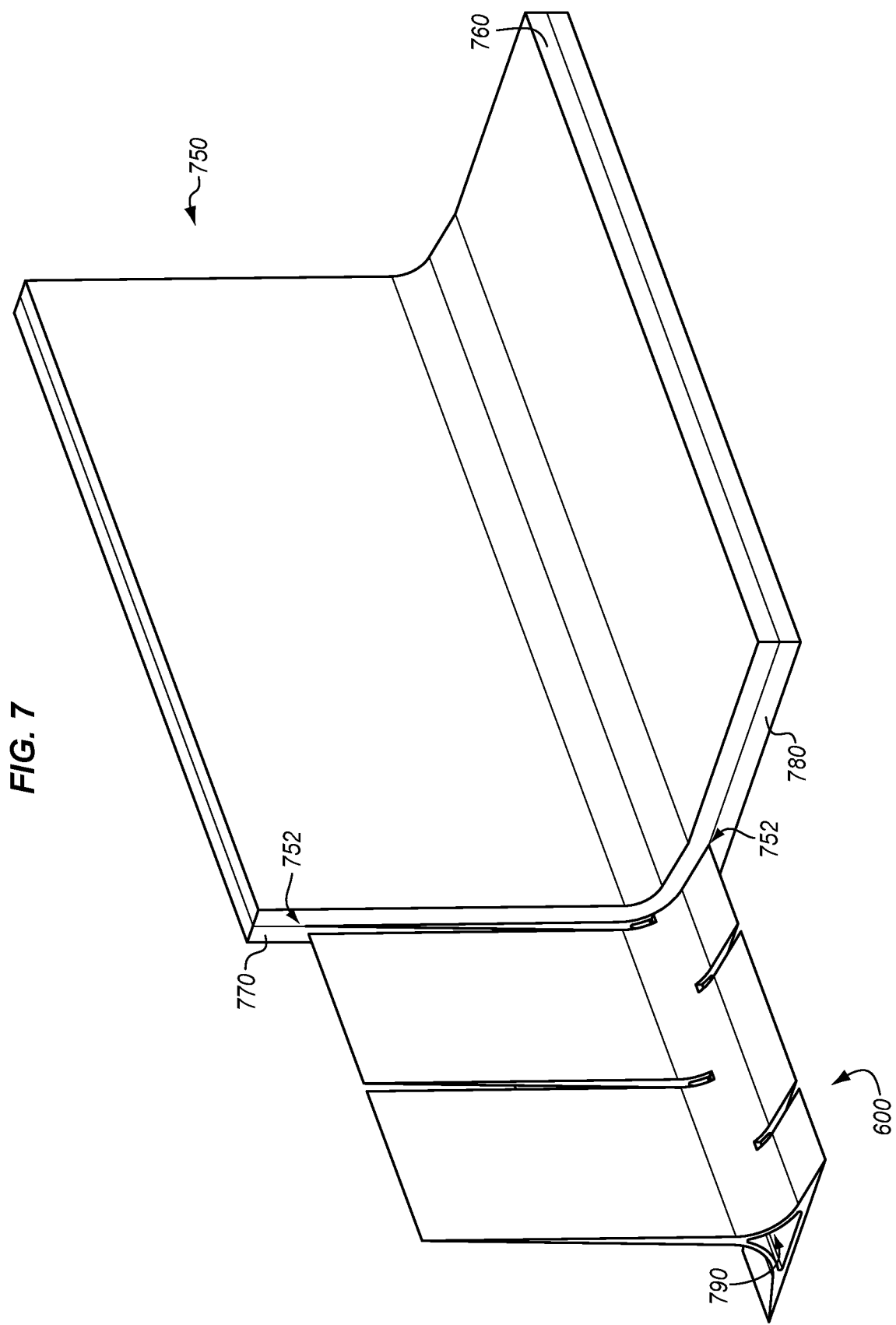
Figure 8:
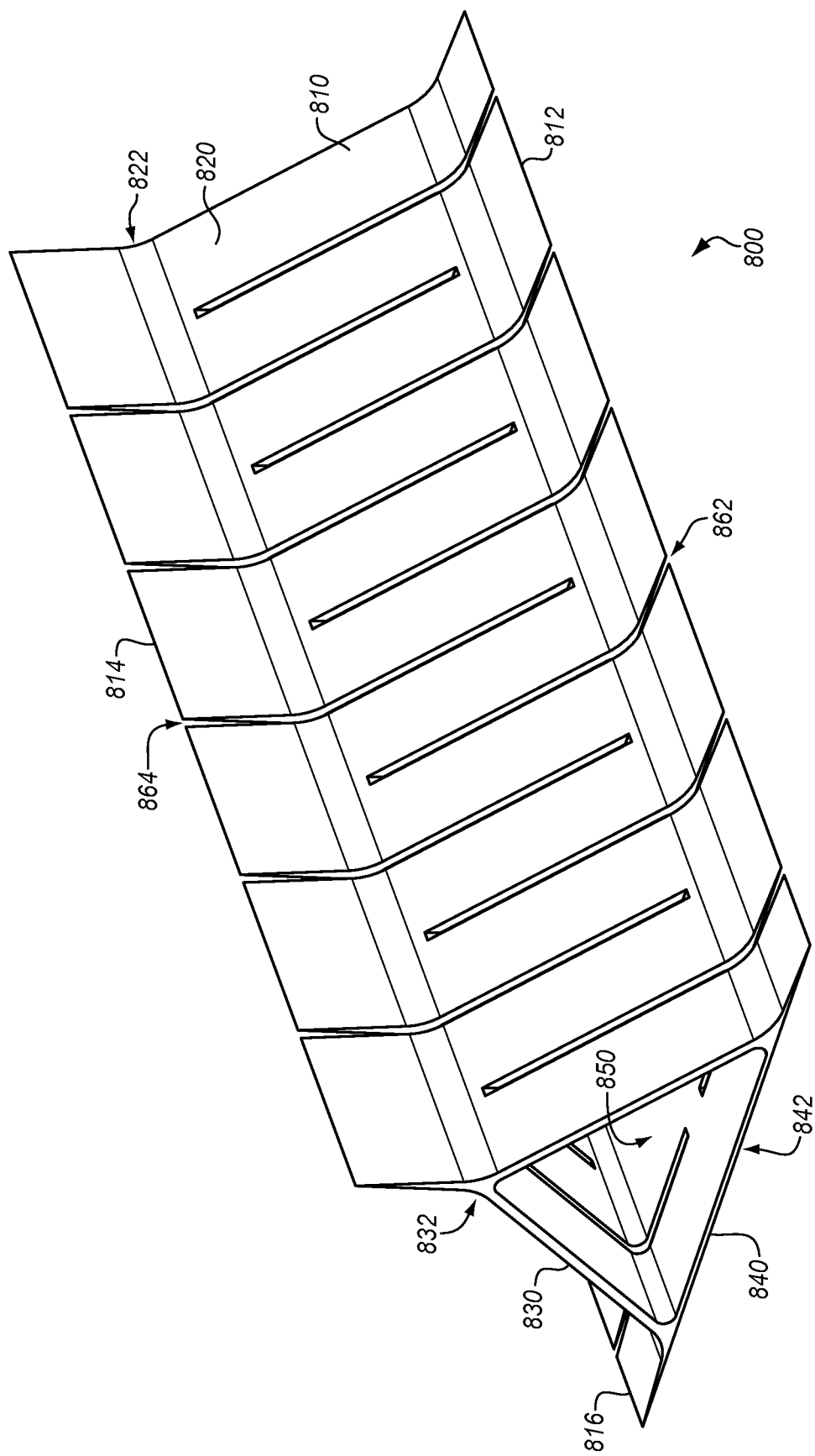
Figure 9:
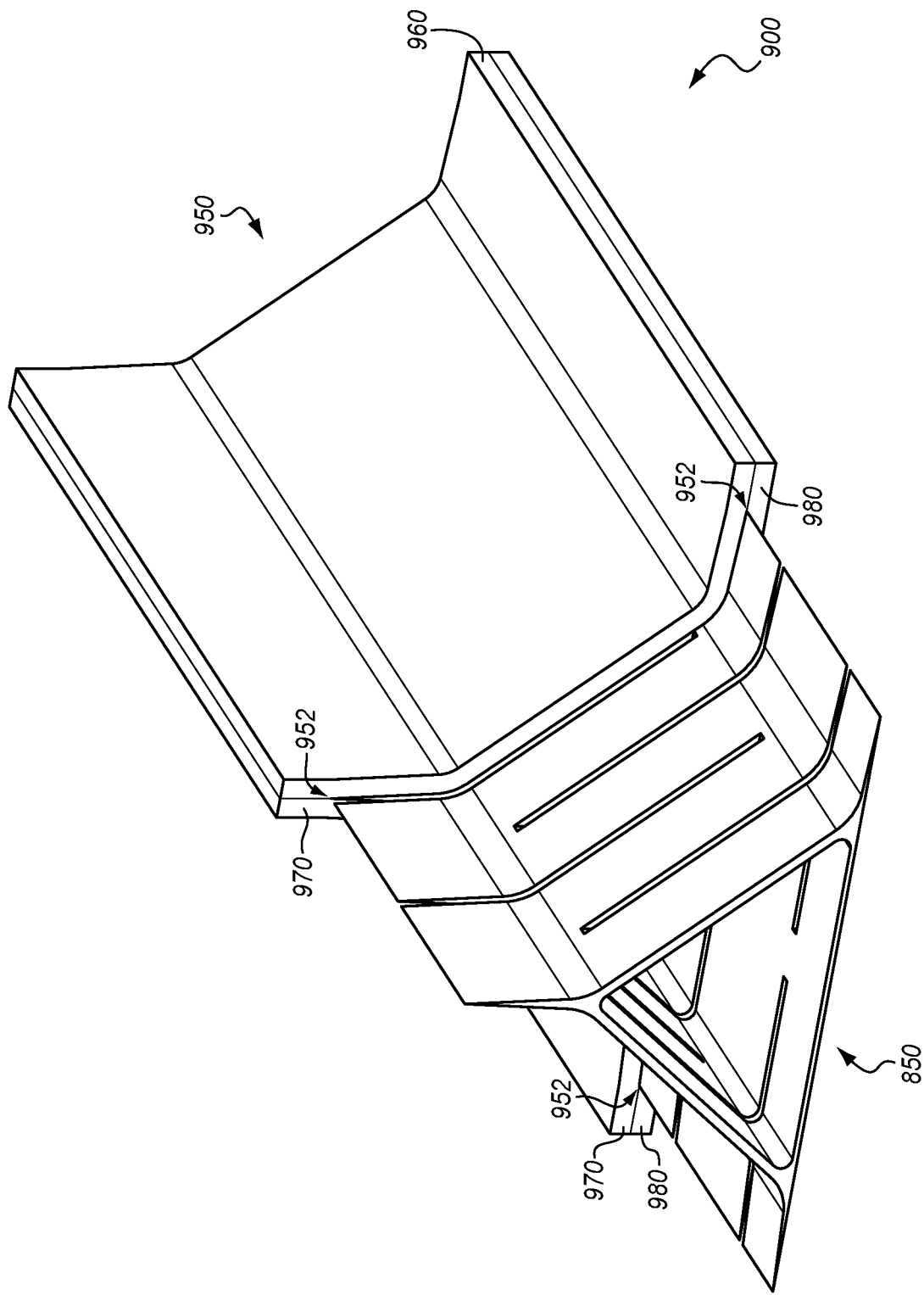
Figure 10:
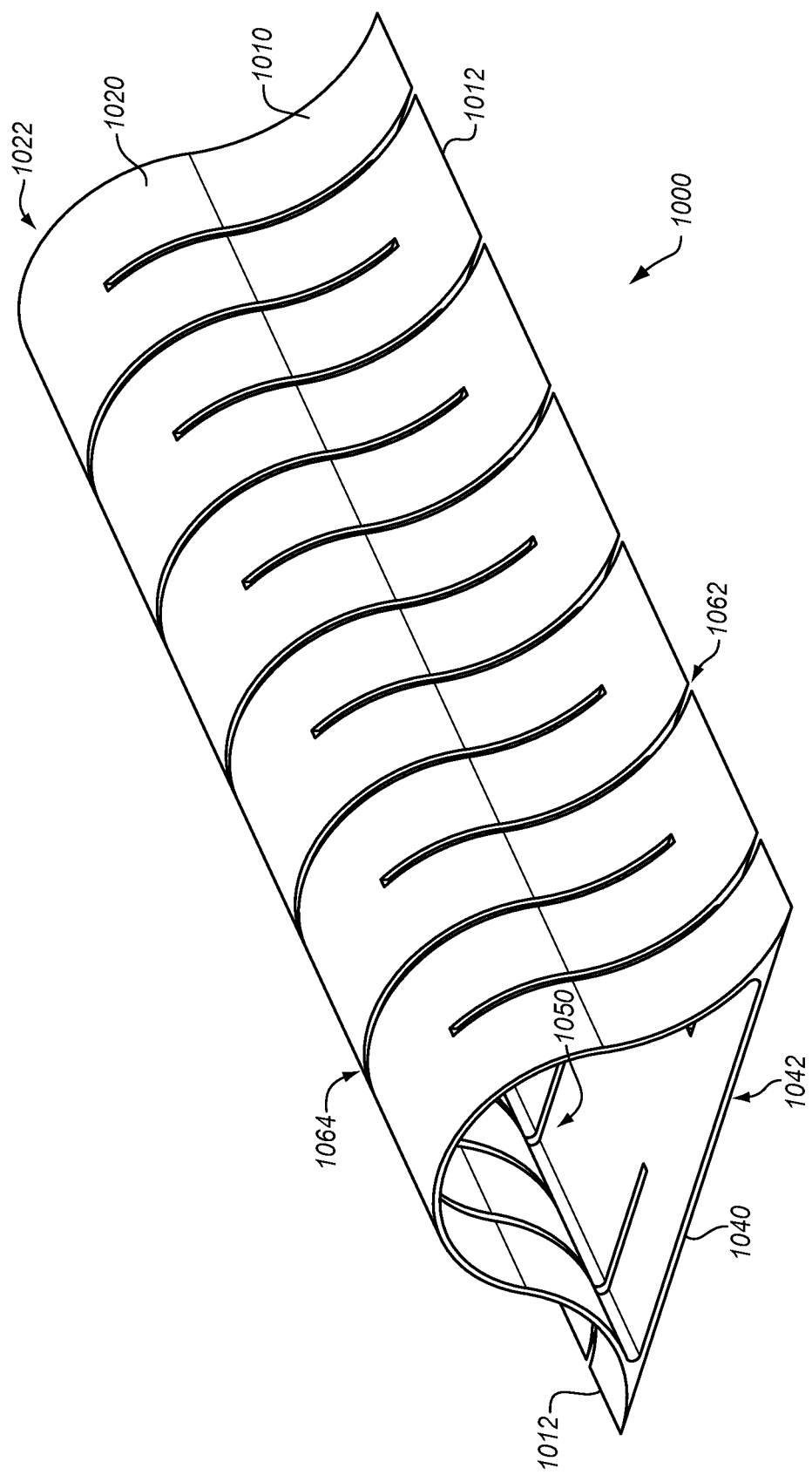
Figure 11:
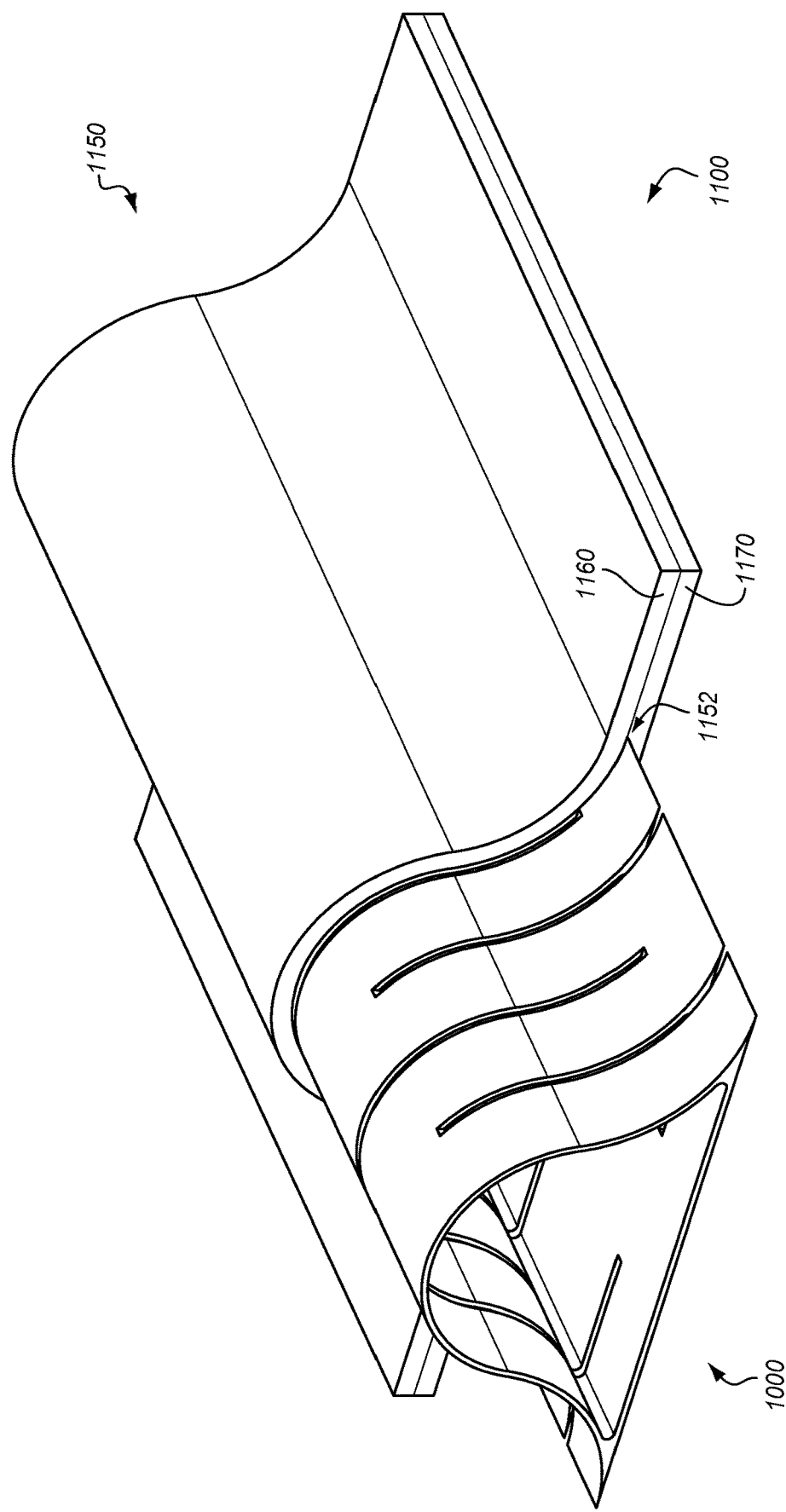
Figure 12:
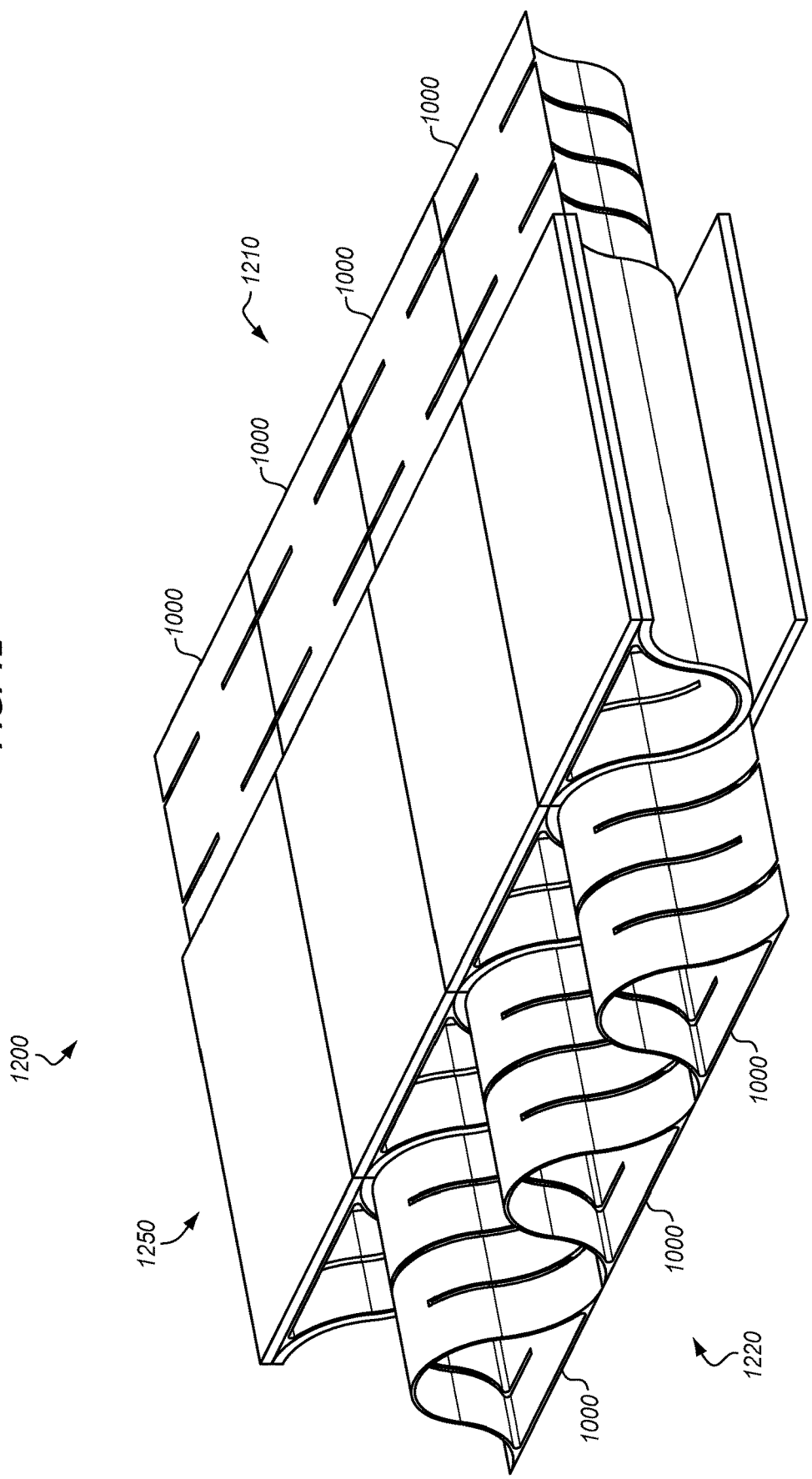

FIGS. 6-7 illustrate tooling for a hybrid composite part that has a substantial vertical dimension. FIGS. 8-9 illustrate tooling for a hybrid composite part having a triangular cross-section, and FIGS. 10-12 illustrate tooling for reinforcing a hybrid composite part having a D-shaped cross-section.

FIGS. 6-7 illustrate a similar blade stiffener configuration to that depicted in FIG. 3, but with tooling that includes a larger vertical projection. This enables greater support/strengthening of a vertical portion of the blade stringer, by increasing an amount of interfacial contact along the vertical portion of the blade stringer between the laminate and the tooling. Hence, the interfacial strength of bonding between the tooling and a laminate is increased, which in turn increases the resistance of a resulting hybrid composite part to delamination.

In FIG. 6, tooling 600 includes a vertical extension to enhance the strength of a resulting hybrid composite part. Tooling 600 includes a body 610 having side 620 (following contour 622), side 630 (following contour 632), and side 640 (following contour 642). Tooling 600 surrounds a void 650, and has flanges 612, flanges 614, and flanges 616 that are formed by cut-outs 662 and cut-outs 664. In FIG. 7, tooling 600 provides a shape for preform 750 at layup 700. Tooling 600 also provides enhanced structural strength at internal corners 752 of preform 750, because it supports these internal corners 752. This means that stresses which could pull sheet 760 apart from sheet 780 are carried through tooling 600 instead of internal corners 752. Because tooling 600 is bonded with the sheets along a substantial distance, tooling 600 has substantial interfacial bond strength with the sheets. At the same, time, stresses received at internal corners of tooling 600 are more likely to be resisted, because the internal radii of corners at tooling 600 are greater than the radii of internal corners 752 at preform 750, and also because the internal corners at tooling 600 are formed from one integral piece, not two separate sheets that are bonded together. Internal corners 752 are formed by intersections between sheet 760, sheet 770, and sheet 780 of preform 750. Tooling 600 may also provide a geometric structural advantage, by increasing a distance of internal corners 752 from a center 790 of the hybrid composite part. This increased distance reduces peel/separation forces experienced by the hybrid composite part.

In FIG. 8, tooling 800 defines a large triangular cavity (i.e., void 850). Tooling 800 includes a body 810 having side 820 (following contour 822), side 830 (following contour 832), and side 840 (following contour 842). Tooling 800 surrounds a void 850, and has flanges 812, flanges 814, and flanges 816 that are formed by cut-outs 862 and cut-outs 864. In FIG. 9, tooling 800 provides a shape for preform 950 at layup 900. Tooling 800 also provides enhanced structural strength at internal corners 952 of preform 950, in a similar manner to tooling 600 of FIG. 6 discussed above. Internal corners 952 are formed by intersections between sheet 960, sheet 970, and sheet 980 of preform 950.

In FIG. 10, tooling 1000 is formed according to a D-shape. In this embodiment, tooling 1000 includes a body 1010 having side 1020 (following contour 1022), and side 1040 (following contour 1042). Tooling 1000 surrounds a void 1050, and has flanges 1012, flanges 614, and flanges 616 that are formed by cut-outs 1062. In FIG. 11, tooling 1000 provides a shape for preform 1150 at layup 1100. Tooling 1000 also provides enhanced structural strength at internal corners 1152 of preform 1150, in a similar manner to tooling 600 of FIG. 6 discussed above. Internal corners 1152 are formed by intersections between sheet 1160 and sheet 1170 of preform 1150.

FIG. 12 illustrates a further embodiment where tooling 1000 may be utilized. In FIG. 12 a first set 1210 of tooling 1000, located on the right side of layup 1200, provides support for a series of D-shaped portions of a preform 1250. Meanwhile, a second set 1220 of tooling 100 is vertically inverted with respect to first set 1210, and provides support for another series of D-shape portions at the preform 1250.

EXAMPLES

In the following examples, additional processes, systems, and methods are described in the context of a hybrid composite part.

Figure 13:
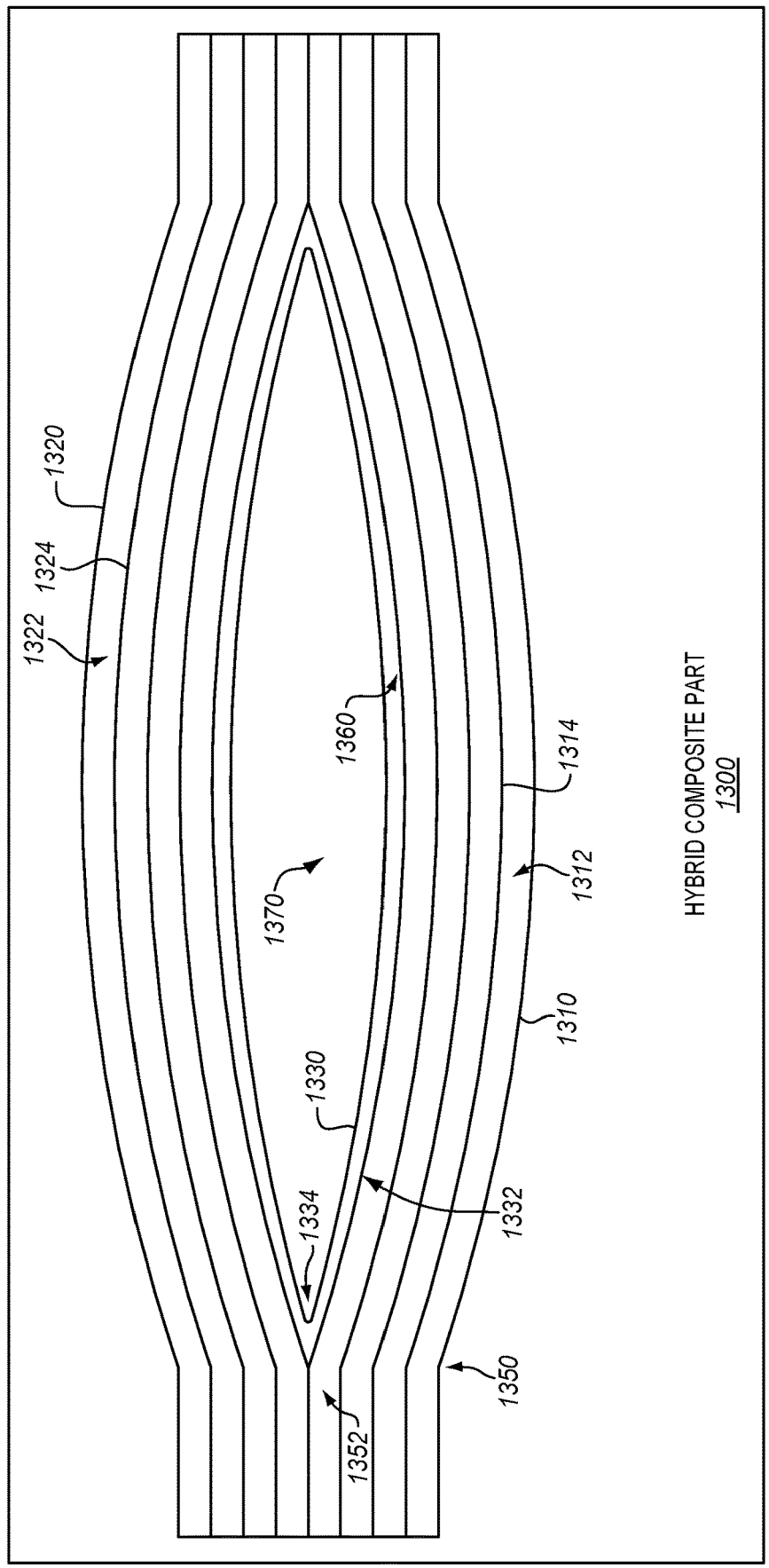
FIG. 13 is a block diagram of a hybrid composite part in an illustrative embodiment.

FIG. 13 is a block diagram of a hybrid composite part 1300 in an illustrative embodiment. According to FIG. 13, hybrid composite part 1300 includes tooling 1330, which is made from a material 1360 such as titanium and surrounds a void 1370. A preform 1350 is disposed onto a surface 1332 of tooling 1330. Preform 1350 includes ply 1310 (comprising resin 1312 and fibers 1314). Preform 1350 also includes ply 1320 (comprising resin 1322 and fibers 1324). Tooling 1330 provides a rigid structure upon which preform 1350 may be placed and hardened. Furthermore, tooling 1330 increases a strength of internal corners at preform 1350, for example by increasing a radius of internal corners at preform 1350. That is, a radius 1334 of tooling 1330 is greater than a radius which would be formed by an internal corner 1352 at an intersection between ply 1320 and ply 1310.

Figure 14:
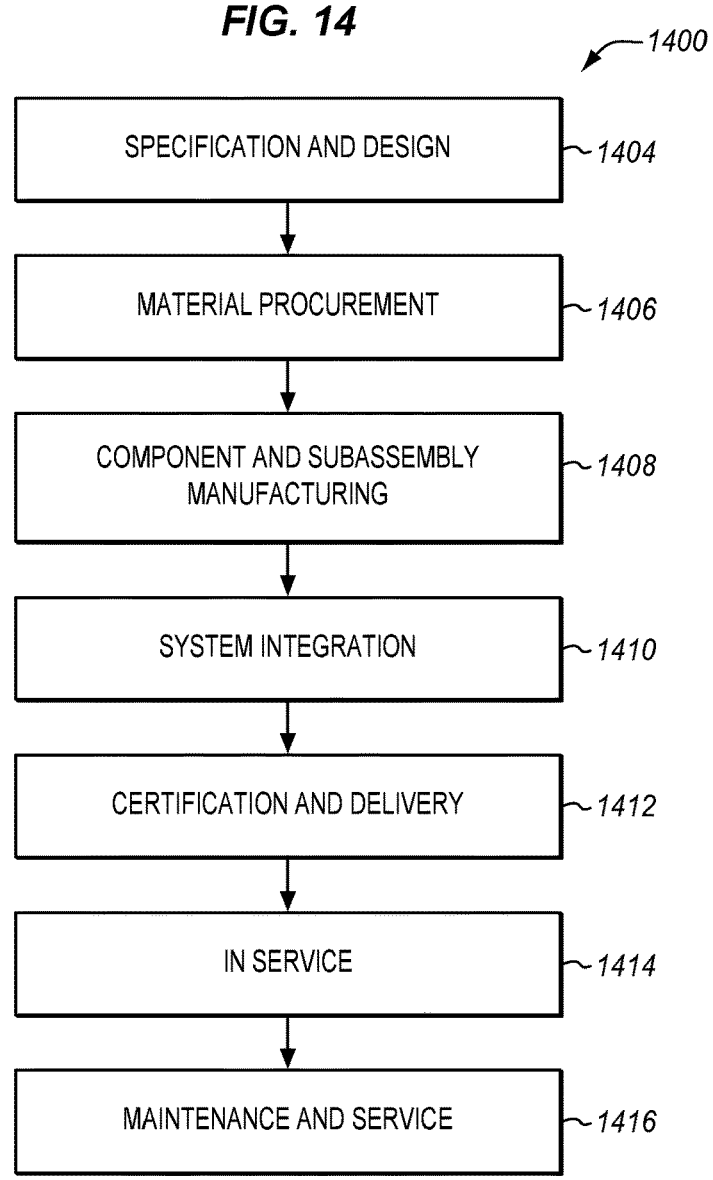
FIG. 14 is a flow diagram of aircraft production and service methodology in an illustrative embodiment.
Figure 15:
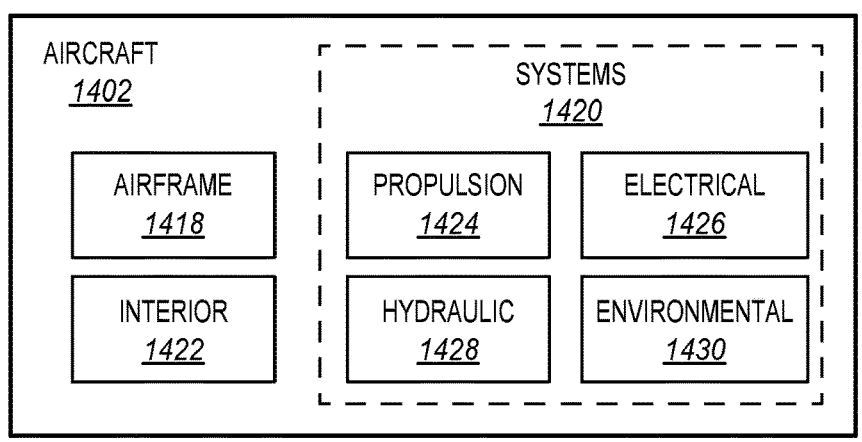
FIG. 15 is a block diagram of an aircraft in an illustrative embodiment.

Referring more particularly to the drawings, embodiments of the disclosure may be described in the context of aircraft manufacturing and service in method 1400 as shown in FIG. 14 and an aircraft 1402 as shown in FIG. 15. During pre-production, method 1400 may include specification and design 1404 of the aircraft 1402 and material procurement 1406. During production, component and subassembly manufacturing 1408 and system integration 1410 of the aircraft 1402 takes place. Thereafter, the aircraft 1402 may go through certification and delivery 1412 in order to be placed in service 1414. While in service by a customer, the aircraft 1402 is scheduled for routine work in maintenance and service 1416 (which may also include modification, reconfiguration, refurbishment, and so on). Apparatus and methods embodied herein may be employed during any one or more suitable stages of the production and service described in method 1400 (e.g., specification and design 1404, material procurement 1406, component and subassembly manufacturing 1408, system integration 1410, certification and delivery 1412, service 1414, maintenance and service 1416) and/or any suitable component of aircraft 1402 (e.g., airframe 1418, systems 1420, interior 1422, propulsion system 1424, electrical system 1426, hydraulic system 1428, environmental 1430).

Each of the processes of method 1400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 15, the aircraft 1402 produced by method 1400 may include an airframe 1418 with a plurality of systems 1420 and an interior 1422. Examples of systems 1420 include one or more of a propulsion system 1424, an electrical system 1426, a hydraulic system 1428, and an environmental system 1430. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1400. For example, components or subassemblies corresponding to component and subassembly manufacturing 1408 may be fabricated or manufactured in a manner similar to components or subassemblies produced while the aircraft 1402 is in service. Also, one or more apparatus embodiments, method embodiments, or a combination thereof may be utilized during the subassembly manufacturing 1408 and system integration 1410, for example, by substantially expediting assembly of or reducing the cost of an aircraft 1402. Similarly, one or more of apparatus embodiments, method embodiments, or a combination thereof may be utilized while the aircraft 1402 is in service, for example and without limitation during the maintenance and service 1416. For example, the techniques and systems described herein may be used for material procurement 1406, component and subassembly manufacturing 1408, system integration 1410, service 1414, and/or maintenance and service 1416, and/or may be used for airframe 1418 and/or interior 1422. These techniques and systems may even be utilized for systems 1420, including, for example, propulsion system 1424, electrical system 1426, hydraulic 1428, and/or environmental system 1430.

In one embodiment, a part comprises a portion of airframe 1418, and is manufactured during component and subassembly manufacturing 1408. The part may then be assembled into an aircraft in system integration 1410, and then be utilized in service 1414 until wear renders the part unusable. Then, in maintenance and service 1416, the part may be discarded and replaced with a newly manufactured part. Inventive components and methods may be utilized throughout component and subassembly manufacturing 1408 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for fabricating a composite part, the method comprising:
   selecting a tool with sides made of a core material in a desired size and shape, wherein a body of the tool includes a void;
   disposing a preform of a fiber reinforced material that surrounds the tool, resulting in a lamina assembly comprising the preform and the tool;
   heating the tool and the preform;
   co-bonding the tool to the fiber reinforced material within the lamina assembly; and
   hardening the preform and the tool into a hybrid composite part.

2. The method of claim 1 further comprising:
   forming the tool such that the body of the tool includes the void.

3. The method of claim 1 further comprising:
   fabricating the tool from sheets of metal.

4. The method of claim 1 further comprising:
   fabricating the tool via additive manufacturing.

5. The method of claim 1 further comprising:
   elastically deforming the hybrid composite part while maintaining a bond between the tool and a fiber reinforced portion of the hybrid composite part, in response to an applied stress.

6. The method of claim 1 wherein:
   disposing the preform comprises disposing Carbon Fiber Reinforced Polymer (CFRP).

7. The method of claim 1 wherein:
   selecting the tool comprises selecting the tool based on a shape of the tool.

8. The method of claim 1 wherein:
   disposing the preform results in the tool filling internal corners of the preform.

9. The method of claim 1 wherein:
   the tool tapers with the preform.

10. The method of claim 1 further comprising:
    forming the tool from titanium.

11. The method of claim 1 wherein:
    the preform comprises multiple plies of the fiber reinforced material.

12. The method of claim 1 further comprising:
    transferring stresses received while bearing load at the hybrid composite part from an exterior of the hybrid composite part to the tool.

13. The method of claim 1 wherein:
    the tool includes one or more flanges.

14. The method of claim 1 wherein:
    selecting the tool comprises selecting the tool that based on the tool having an elongated body.

15. The method of claim 1 wherein:
    selecting the tool comprises selecting the tool based on the tool having sides that are shaped according to a contour.

16. The method of claim 1 wherein:
    selecting the tool comprises selecting a tool that includes cut-outs.

17. The method of claim 16 wherein:
    the cut-outs penetrate multiple sides of the tool.

18. The method of claim 1 wherein:
    selecting the tool comprises selecting the tool based on the tool having a triangular cavity.

19. The method of claim 1 wherein:
    co-bonding comprises cooling a thermoplastic of the preform below a melting temperature of the thermoplastic.

20. The method of claim 1 wherein:
    co-bonding comprises heating a thermoset resin of the preform.

* * * * *